Sept. 5, 1950  R. B. LEWIS  2,521,467
TOOTH MATRIX RETAINER
Filed Nov. 19, 1945
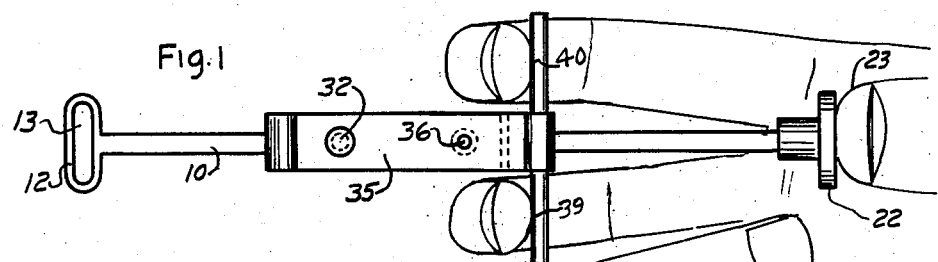
Fig. 1
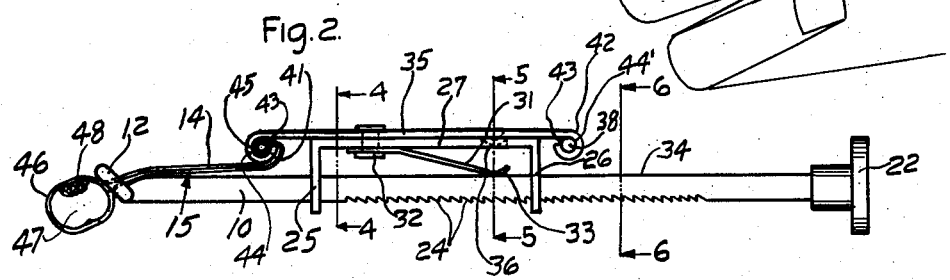
Fig. 2
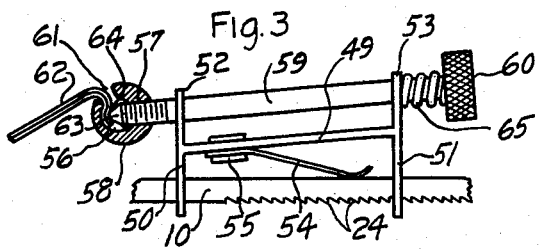
Fig. 3
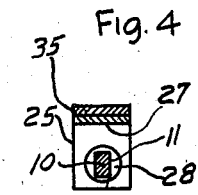
Fig. 4
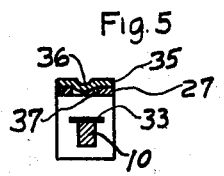
Fig. 5
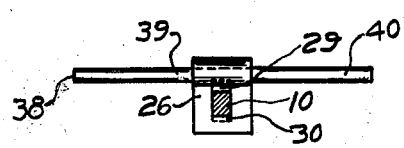
Fig. 6
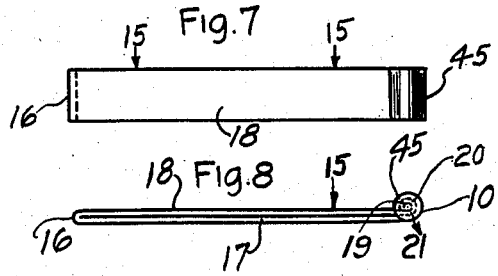
Fig. 7
Fig. 8
Fig. 9
INVENTOR.
Richard B. Lewis
BY
Attorney Patented Sept. 5, 1950

2,521,467

UNITED STATES PATENT OFFICE 2,521,467

TOOTH MATRIX RETAINER

Richard B. Lewis, St. Paul, Minn.

Application November 19, 1945, Serial No. 629,626

4 Claims. (Cl. 32—63)

My invention relates to a tooth matrix retainer and has for its object the provision of an instrument which, by the use of one hand, may readily lay a band about a tooth where a cavity is to be filled, and which will act as a retainer for the matrix.

A large field of dental work is, of course, the cleaning out of cavities and inserting in the cavities a matrix of material which is soft when pressed into place, but subsequently hardens and seals up the cavity. In many instances the cavity is large and exposed and unless some means for retaining the matrix is provided, it may loosen and fall out before it is set as a filling, or some part of it may break away. The retainer is also frequently required in connection with the making of inlays where the same trouble is met with.

There have been devices prepared and on the market for putting a hand retainer about a tooth, but all of these devices heretofore employed have required the use of two hands to place the band in position and are awkward and cumbersome and frequently entirely ineffective.

The band employed is a band of very thin, light and non-elastic metal. It should never be used more than once, for it necessarily requires two strips of metal held fairly close together and sterilization is not always effective.

In the past there has been a good deal of difficulty in finding ways to get the band attached to any apparatus for placing it about the tooth, hence ease in arranging the band assembly in the apparatus is important.

I have discovered a very simple means, in conjunction with a novel and effective band arrangement, whereby a band retainer may be placed about a tooth with the use of only one hand, greatly facilitating the use of such a construction as it leaves the other hand free to hold tissues in a desired position, to hold implements such as a mouth mirror, or for other uses.

The basis of my discovery resides in the fact that I provide a holder member which has a slotted band guide at its front end, a ratchet along one edge and a thrust member at its rear end, in combination with a slide having thereon means for holding the band member and means for permitting the slide to be pulled along the holder member or holder bar, together with ratchet means on the slide which take into the ratchet teeth when the band has been pulled tight in position.

It is a principal object of my invention, therefore, to provide a bar having a laterally extended band guide at one end, a thrust member at the other end and ratchet teeth along an edge.

It is a further important object of my invention to provide a slide on the bar which has means thereon for removably connecting thereto a band unit which will extend through the band guide and which may be readily opened up so as to be placed about the tooth upon which work is being done.

It is a further object of my invention to mount the slide upon the bar in conjunction with a spring and to form on the slide a loop member which has a ratchet portion adapted to engage the teeth on the under side of the slide, the spring operating to maintain the ratchet member in contact with the teeth.

It is a further object of my invention to have a transverse pull member connected with the slide so as to give a finger-hold on each side thereof so that with the thumb against the thrust member on the bar and the two front fingers engaging the ends of this pull member, the whole arrangement, so held, may be manipulated to press the loop of the band member over the tooth, so that, with a single closing movement of the hand, the band member may be drawn tight and set about the tooth.

It is a further object of my invention to have the band holder pivoted upon the slide with means for holding it normally in a central position, and yet which may permit it to be oscillated to one side or the other of the slide and thus enable the band to be placed angularly upon the tooth or so as to get greater compression at one part of the tooth than at another.

The full objects and advantages of my invention will be pointed out in detail in the appended specification, and the novel features by which the advantageous and useful results above indicated are obtained will be particularly pointed out in the claims.

In the drawings illustrating an application of my invention in one of its forms:

Fig. 1 is a plan view of the invention indicating also the manner in which thumb and fingers are employed.

Fig. 2 is a side elevation view showing the band unit brought in position about a tooth, and the band drawn tight thereon.

Fig. 3 is a modified means of securing a band member to the apparatus viewed from the side.

Fig. 4 is a sectional view taken on line 4—4 of Fig. 2.

Fig. 5 is a sectional view taken on line 5—5 of Fig. 2.

Fig. 6 is a sectional view taken on line 6—6 of Fig. 2.

Fig. 7 is a plan view on an enlarged scale of a special band member adapted to be applied to a tooth.

Fig. 8 is an edge view of what is shown in Fig. 7, showing the manner of securing the ends of the band member in position in my apparatus.

Fig. 9 is an edge view similar to Fig. 8, showing the loop expanded ready to be placed over the tooth.

As illustrated, a chief member of my apparatus comprises a bar 10. This bar is rectangular in cross-section, which may be longer in one direction than the other, as shown at 11 in Fig. 4. At its front end it is provided with an elongated guide loop 12 having a guide opening 13. The bar 10 is bent at the loop 12 so the latter is disposed at an obtuse angle to the bar 10. In this position it receives in the opening 13 the doubled extent 14 of the band unit 15.

This band unit before prepared for use comprises an extended strip of metal folded upon itself at 16, and having the two portions of the strip 17 and 18 in contact or otherwise with their ends 19 and 20 circled upon each other, as indicated in Figs. 2, 8 and 9. The end 19, as the strip 17 is rolled, comes outside the rolled end 20 of the strip section 18. This forms a tight roll substantially cylindrical, and a blob of solder 21 is placed upon the edges of ends 19 and 20 and in the central opening inside of loop formed by turning end 20, to hold the parts in fixed roll-forming relation.

The bar 10 has at its other end a thrust member 22 which is secured to bar 10 in any suitable manner and which is adapted to receive the thumb of the operator for effecting a thrust forward on the bar 10 in opposition to the pull of the two fingers, as will later be pointed out. The thumb is shown in position on the thrust member 22 at 23 in Fig. 1.

The bar 10 is provided on its under side with a multiplicity of ratchet teeth 24, as clearly shown in Figs. 2 and 3. These teeth project rearwardly toward the thrust member 22, as shown.

Mounted upon the bar 10 are two legs 25 and 26 of a slide 27 formed integral or connected with the legs 25 and 26 at its respective ends. The leg 25 is formed with a round opening 28, Fig. 4, through which the bar 10 and its ratchet teeth 24 may be easily caused to move back and forth longitudinally. The leg 26, Fig. 6, is formed with a rectangular opening 29 considerably longer than the cross-sectional depth of bar 10. This permits the bar 10 and the slide 27 to oscillate together upon a fulcrum formed by contact of an edge of the bar 10 with the wall of round opening 28 through leg 25.

The lower rim of the opening 29, designated by the numeral 30 in Fig. 6, is formed as a detent, as it is drawn to the rear, which is adapted to slide over the ratchet notches 24 on the lower side of bar 10. These members are held normally continuously in contact by means of a leaf spring 31, Fig. 2, which is secured to the slide 27 by means of a rivet or other suitable fastening 32, Fig. 2, and which has a curved lower end 33 that engages the upper edge 34 of bar 10 and thus tends continuously to press up on the slide 27 and hold the ratchet 30 upon the ratchet teeth 24.

When, however, it is desired to move the slide ahead against the direction in which the ratchet teeth are pointed, this can readily be effected by merely pushing downwardly on the slide 27 so that the bar 10 will contact the top of slot 29, after which the slide 27 can be freely moved without engaging teeth 24.

Upon the same pivot 32 which secures the spring 31 to the under side of slide 27, is pivotally secured a band holder member 35. This member is held fairly tight upon the top of slide 27 so that a depressed teat 36, Fig. 5, is caused to enter a depression or a circular opening 37, on the top of slide 27 as best shown in Fig. 5. The band holder 35 will thus be held normally in direct alignment with the slide 27, which is also in alignment with the guide slot 13 at the front end of the bar 10.

There are times, however, when, due to the formation of a tooth being treated, or for other reasons, it is desirable to put greater stress on one edge of the band than on the other edge, and when such a condition arises the band holder 35 may be swung to one side or the other when the teat will engage and be restrained by the corresponding edge of the slide 27. This will put greater force upon the edge of the band which is at the same side as that to which the band holder has been swung.

The band holder 35 has at its end turned-over hook members designated as 41 and 42 respectively. These members provide a circular transverse opening 44 in the hook member 41, and a similar opening 44' in the hook member 42 with a gap 43 between the end of the turned-over hook portions and the body of the band holder 35. This space is large enough at hook portion 41 to readily admit the double band thickness 17 and 18 of the band assembly 15. The transverse cylindrical passageway 44 within the hook member 41 is large enough to admit the cylindrical head 45 on the end of the band assembly 15, which is formed by the rolled-over ends 19 and 20 of the band layers 17 and 18.

The hook portions are turned down, as clearly shown in Figs. 1 and 2. To put a band assembly in position in the passageway 44 of hook member 41 it is only necessary to pass the doubled strips at their folded end 16 through guide slot 13 and to pass the edges thereof through the slot 43 and into the cylindrical transverse opening 44 in 41 and the band is in position for use.

With a pressed fit in the transverse opening 44' of hook member 42, a rod 38 is held in position within hook member 42, with the parts 39 and 40 thereof extending equal distances on either side of the band holder 35. As shown in Fig. 1, the two front fingers of either hand will engage the parts 39 and 40 of the pull member 38 on each side of the band holder 35, and, with the thumb on the thrust member 22, necessary force can be applied to pull backward on the slide and move it along the band 10, and in that manner tension the band member about a tooth, and hold it tensioned by engagement of the ratchet piece 30 with a ratchet tooth 24.

To use it the end 16 will be formed into an enlarged loop 46, Fig. 9, which, of course, has but a single band portion forming the body of the loop. With the parts in this position and using only one hand, the right hand, as indicated in Fig. 1, or the left hand, the loop 46 may be passed about a tooth 47 being treated, Fig. 2, and a push with the thumb on the thrust member 22 and a pull with the two front fingers on the pull members 39 and 40 will produce a quick and tight securing of the band loop 46 upon the tooth 47.

The cavity, indicated at 48, will then receive its matrix which will be retained by the band loop 46 until sufficiently set so that it can be safely released.

In Fig. 3 there is shown a somewhat different type of band holder and slide device. In this form of the device a slide base 49 is provided with depending arms 50 and 51, of which arm 51 will be longer than arm 50. Extending in opposite directions and fast on slide base 49 are other arms 52 and 53. The bar 10 goes through openings in the respective depending arms 50 and 51 which are strictly analogous to, indeed identical with, the openings 28 and 29, shown in Figs. 4 and 6, and heretofore described. The spring 54, secured by a rivet member 55, is also identical in position and functions with the spring 31 on pivot member 32.

In this form, the band holder comprises a transverse sleeve member 56 circular in outer cross-section and having a threaded hole 57 in which is screwed the threaded end 58 of a bolt member 59 having on its rear end a thumb nut 60. There is also a transverse slot 61 through which is adapted to extend, as shown, the double band end 62 of the band assembly 15. Upon screwing up on the bolt 59 the point 63 thereof will engage the doubled strands of the band member 62 and wedge it within the center transverse opening 64 in the head 56. A spring 65 compressed between the adjacent faces of the thumb nut 60 and arm 53 holds the assemblage firmly together, and additionally tensions the loop 46 about the tooth when the detent falls short of a final ratchet tooth.

The advantages of my invention will be apparent from the foregoing description. With one hand free to hold a tooth mirror or any other implement, the other hand positioned as indicated in Fig. 1, can readily apply to any tooth wherever situated in the mouth, and fasten it in position, the metal band loop 46, and do it almost instantaneously. This matter of being able to put the loop in position and secure it with a single hand, thus leaving the other hand free for other uses, is a matter of extreme importance. For in using a band former with only one hand it not only saves time but makes practicable a much better and more certain application of the band to a tooth.

I claim:

1. Means for applying a matrix-retaining band to a tooth, comprising a rigid bar having a band guide at its front end, a thrust member at its rear end and a series of ratchet teeth along the edge, a slide having two arms with openings therein through which the bar extends, resilient means carried by the slide and engageable with said bar for holding a portion of the rear arm against the ratchet teeth, means on the bar for holding the ends of a doubled strip of thin metal band with its doubled end passing through the guide and formed into a loop to be positioned about a tooth, and members secured to the slide and giving a finger hold for the two forefingers so that in cooperation with the thrust member the slide may be forcibly moved backward and the arm will lock it in its band-tightening position.

2. Means for applying a matrix-retaining band to a tooth, comprising a rigid bar having a band guide at its front end, a thrust member at its rear end and a series of ratchet teeth along an edge, a slide having two arms with openings therein through which the bar extends, the opening in the rear arm being longer than the depth of the bar to permit the slide to oscillate upon the front arm, a spring for normally holding a portion of said rear arm against the ratchet teeth, means on the bar for holding the ends of a doubled strip of thin metal band with its doubled end passing through the guide and formed into a loop to be positioned about a tooth, and a transverse rod secured to the slide and giving a finger hold for the two forefingers so that in cooperation with the thrust member the slide may be forcibly moved backward and the arm will lock it in its band-tightening position.

3. Means for applying a matrix-retaining band to a tooth, comprising a rigid bar having a band guide at its front end, a slide mounted upon and to be moved along said bar, a band holder pivoted to said slide, means on the band holder cooperating with means on the slide for holding the band holder upon and normally in alignment with the slide, said band holder being adapted to be swung laterally to one side or the other of the slide, a band assembly secured to an end of the holder and extending through the guide to be formed into a loop to be positioned about a tooth, said holder adapted to be swung at an angle to either side of the slide, and means for forcibly moving the slide along the bar to draw the loop tight about a tooth, whereby the band will be tightened about the tooth uniformly across its width when it extends in alignment with the slide and will be tightened more at one or the other edge when the band holder has been moved to one side or the other side of the slide.

4. A dental instrument which comprises, a slide member formed with a pair of depending arms, each of said arms having an aperture which is aligned with the aperture in the other arm, a bar formed with ratchet teeth on one of its lateral sides and a loop formed at one end, said bar extending through the apertures in the arms of said slide member; a band of relatively flexible metal folded upon itself and having its folded center passing through the loop on said bar and extending beyond the end of the loop for surrounding a tooth, a bandholder carried by said slide member for gripping the outer ends of said band, finger hold members for moving the bandholder and the slide member with relation to the bar to tighten the folded end of the band about a tooth, and a spring carried by said slide member for urging the bar in a direction to engage the ratchet teeth with one of the arms of said slide member in such a manner as to lock the band in a tightened position with relation to the tooth.

RICHARD B. LEWIS.

REFERENCES CITED

The following references are of record in the file of this patent:

UNITED STATES PATENTS

| Number | Name | Date |
| --- | --- | --- |
| 531,833 | Bruce | Jan. 1, 1895 |
| 911,307 | Ivory | Feb. 2, 1909 |
| 1,094,203 | Eaton | Apr. 21, 1914 |
| 2,087,108 | Irvine | July 13, 1937 |
| 2,232,236 | Hlavic and Hill | Feb. 18, 1941 |

FOREIGN PATENTS

| Number | Country | Date |
| --- | --- | --- |
| 401,948 | Great Britain | Nov. 22, 1933 |

OTHER REFERENCES

Dental Survey for June 1937, page 770; a copy is in Div. 55 of the Patent Office.